(12) United States Patent
Sharma

(10) Patent No.: US 7,321,761 B2
(45) Date of Patent: Jan. 22, 2008

(54) METHOD AND APPARATUS FOR PREVENTING UNAUTHORIZED DATA FROM BEING TRANSFERRED

(75) Inventor: Sanjeev K. Sharma, Pottstown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 11/284,940

(22) Filed: Nov. 22, 2005

(65) Prior Publication Data

US 2006/0140409 A1 Jun. 29, 2006

Related U.S. Application Data

(60) Provisional application No. 60/633,222, filed on Dec. 3, 2004.

(51) Int. Cl.
*H04M 1/66* (2006.01)
(52) U.S. Cl. .................. 455/411; 455/410; 455/435.1; 713/168; 380/247; 370/328
(58) Field of Classification Search ................ 455/411, 455/410, 435.1; 713/168; 380/247; 370/328
See application file for complete search history.

(56) References Cited

U.S. PATENT DOCUMENTS

| | | | |
|---|---|---|---|
| 5,778,304 | A | 7/1998 | Grube et al. |
| 5,959,717 | A | 9/1999 | Chaum |
| 5,960,081 | A | 9/1999 | Vynne et al. |
| 6,018,374 | A | 1/2000 | Wrobleski |
| 6,266,541 | B1 | 7/2001 | Noda |
| 6,343,213 | B1 | 1/2002 | Steer et al. |
| 6,353,778 | B1 | 3/2002 | Brown |
| 6,393,254 | B1 | 5/2002 | Pousada |
| 6,492,897 | B1 * | 12/2002 | Mowery, Jr. ................. 455/522 |
| 6,529,600 | B1 | 3/2003 | Epstein et al. |
| 6,559,883 | B1 | 5/2003 | Fancher et al. |
| 6,591,096 | B2 | 7/2003 | Ezuriko |
| 6,624,874 | B2 | 9/2003 | Revelli et al. |
| 6,625,455 | B1 | 9/2003 | Ariga |
| 6,662,023 | B1 | 12/2003 | Helle |
| 6,687,497 | B1 | 2/2004 | Parvulescu et al. |

(Continued)

FOREIGN PATENT DOCUMENTS

EP 0 505 266 3/1992

(Continued)

OTHER PUBLICATIONS

Mobasseri, "Exploring CDMA for Watermarking of Digital Video", Security and Watermarking of Multimedia Contents, Electronic Imaging'99, San Jose, Jan. 23-29, 1999.

(Continued)

*Primary Examiner*—Danh C. Le
(74) *Attorney, Agent, or Firm*—Volpe and Koenig, P.C.

(57) ABSTRACT

A method and apparatus for preventing the transfer of unauthorized data among a wireless transmit/receive unit (WTRU), an external network, and at least one access point in a wireless communication system includes the WTRU recording a subject and storing the recording as data in a memory of the WTRU. The WTRU transmits the data to the access point. The access point examines the data to determine if the data is allowed for transfer to the external network.

26 Claims, 3 Drawing Sheets

U.S. PATENT DOCUMENTS

| | | | |
|---|---|---|---|
| 6,738,495 | B2 | 5/2004 | Rhoads et al. |
| 6,738,572 | B2 | 5/2004 | Hunter |
| 6,771,946 | B1 | 8/2004 | Oyaski |
| 6,809,792 | B1 | 10/2004 | Tehranchi et al. |
| 6,868,229 | B2 | 3/2005 | Balogh |
| 6,950,532 | B1 | 9/2005 | Schumann et al. |
| 7,043,048 | B1 | 5/2006 | Ellingson |
| 7,139,014 | B1 * | 11/2006 | Kim et al. ............... 348/14.01 |
| 7,142,691 | B2 | 11/2006 | Levy |
| 7,158,776 | B1 * | 1/2007 | Estes et al. ................ 455/411 |
| 2001/0031631 | A1 | 10/2001 | Pitts |
| 2001/0036821 | A1 * | 11/2001 | Gainsboro et al. .......... 455/410 |
| 2002/0019223 | A1 * | 2/2002 | Lee et al. .................. 455/411 |
| 2002/0039896 | A1 | 4/2002 | Brown |
| 2002/0044659 | A1 * | 4/2002 | Ohta .......................... 380/241 |
| 2002/0055361 | A1 | 5/2002 | McDonnell et al. |
| 2002/0057823 | A1 | 5/2002 | Sharma et al. |
| 2002/0058497 | A1 | 5/2002 | Jeong |
| 2002/0076084 | A1 | 6/2002 | Tian et al. |
| 2002/0078357 | A1 | 6/2002 | Bruekers et al. |
| 2002/0107032 | A1 | 8/2002 | Agness et al. |
| 2002/0126871 | A1 | 9/2002 | Hannigan et al. |
| 2002/0168069 | A1 | 11/2002 | Tehranchi et al. |
| 2002/0186845 | A1 | 12/2002 | Dutta et al. |
| 2003/0012548 | A1 | 1/2003 | Levy et al. |
| 2003/0028380 | A1 | 2/2003 | Freeland et al. |
| 2003/0078076 | A1 | 4/2003 | Kuwajima et al. |
| 2003/0112974 | A1 | 6/2003 | Levy |
| 2003/0112996 | A1 | 6/2003 | Holliman et al. |
| 2003/0122671 | A1 | 7/2003 | Jespersen |
| 2003/0133573 | A1 | 7/2003 | Himmel et al. |
| 2003/0169342 | A1 | 9/2003 | Steinberg et al. |
| 2003/0219144 | A1 | 11/2003 | Rhoads et al. |
| 2003/0219231 | A1 | 11/2003 | Vernon |
| 2004/0005078 | A1 | 1/2004 | Tillotson |
| 2004/0025024 | A1 | 2/2004 | Hirai |
| 2004/0029552 | A1 * | 2/2004 | Miki et al. .................. 455/344 |
| 2004/0029560 | A1 | 2/2004 | Ariga |
| 2004/0073803 | A1 | 4/2004 | Keramane |
| 2004/0101282 | A1 | 5/2004 | Kuroda et al. |
| 2004/0110515 | A1 | 6/2004 | Blumberg et al. |
| 2004/0125125 | A1 | 7/2004 | Levy |
| 2004/0155969 | A1 | 8/2004 | Hayashi |
| 2004/0190716 | A1 | 9/2004 | Nelson |
| 2004/0198306 | A1 | 10/2004 | Singh et al. |
| 2004/0204021 | A1 | 10/2004 | Cocita |
| 2005/0007456 | A1 | 1/2005 | Lee et al. |
| 2005/0008324 | A1 | 1/2005 | Balogh |
| 2005/0039020 | A1 | 2/2005 | Levy |
| 2005/0043548 | A1 | 2/2005 | Cates |

FOREIGN PATENT DOCUMENTS

| | | |
|---|---|---|
| EP | 0 830 046 | 3/1998 |
| EP | 1 130 500 | 9/2001 |
| EP | 1 139 684 | 10/2001 |
| EP | 1 172 270 | 1/2002 |
| EP | 1 182 901 | 2/2002 |
| EP | 1 379 098 | 1/2004 |
| EP | 1 381 234 | 1/2004 |
| EP | 1 185 923 | 3/2004 |
| EP | 1 445 923 | 8/2004 |
| EP | 1 499 148 | 1/2005 |
| GB | 0 211 612 | 2/1927 |
| GB | 211612 | 2/1927 |
| GB | 2 329 794 | 3/1999 |
| GB | 2 343 339 | 5/2000 |
| GB | 2 348 573 | 10/2000 |
| GB | 2 367 720 | 4/2002 |
| GB | 2 374 986 | 10/2002 |
| GB | 2 393 075 | 3/2004 |
| JP | 2000013497 | 1/2000 |
| JP | 2000032557 | 1/2000 |
| JP | 2000152217 | 5/2000 |
| JP | 2000165952 | 6/2000 |
| JP | 2000332890 | 11/2000 |
| JP | 2001313006 | 11/2001 |
| JP | 2002044736 | 2/2002 |
| JP | 2002125267 | 4/2002 |
| JP | 2002159059 | 5/2002 |
| JP | 2003070058 | 3/2003 |
| JP | 2003143649 | 5/2003 |
| JP | 2003219466 | 7/2003 |
| JP | 2004056769 | 2/2004 |
| JP | 2004088273 | 3/2004 |
| JP | 2004153324 | 5/2004 |
| JP | 2004242096 | 8/2004 |
| JP | 2004260631 | 9/2004 |
| JP | 2004260796 | 9/2004 |
| JP | 2005033799 | 2/2005 |
| TW | 566045 | 12/2003 |
| TW | 200536325 | 11/2005 |
| WO | 98/34412 | 8/1998 |
| WO | 00/60556 | 10/2000 |
| WO | 02/103968 | 12/2002 |
| WO | 03/028342 | 4/2003 |
| WO | 03/040898 | 5/2003 |
| WO | 03/047207 | 6/2003 |
| WO | 2004/089021 | 4/2004 |
| WO | 2004/089021 | 10/2004 |
| WO | 2004/102313 | 11/2004 |
| WO | 2005/078656 | 8/2005 |

OTHER PUBLICATIONS

Sanzgiri et al., "A Secure Routing Protocol Ad Hoc Networks", Proceedings of the 10th IEEE International Conference on Network Protocols (ICNP '02), IEEE, 2002, pp. 1-10.

Arslanagic, "Personal Firewall in Mobile Phone", Masters Thesis in Information and Communication Technology, Agder University College Faculty of Engineering and Science, Grimstad, Norway, May 2004.

Mobasseri, "Exploring CDMA for Watermarking of Digital Video", Security and Watermarking of Multimedia Contents, Electronic Imaging'99, San Jose, Jan. 23-29, 1999.

Sanzgiri et al., "A Secure Routing Protocol for Ad Hoc Networks", Proceedings of the 10th IEEE International Conference on Network Protocols (ICNP '02), IEEE, 2002, pp. 1-10.

Arslanagic, "Personal Firewall in Mobile Phone", Masters Thesis in Information and Communication Technology, Agder University College Faculty of Engineering and Science, Grimstad, Norway, May 2004.

Mobasseri, "Exploring CDMA for Watermarking of Digital Video", Security and Watermarking of Multimedia Contents, Electronic Imaging'99, San Jose, Jan. 23-29, 1999.

Sanzgiri et al., "A Secure Routing Protocol for Ad Hoc Networks", Proceedings of the 10th IEEE International Conference on Network Protocols (ICNP '02), IEEE, 2002, pp. 1-10.

Arslanagic, "Personal Firewall in Mobile Phone", Masters Thesis in Information and Communication Technology, Agder University College Faculty of Engineering and Science, Grimstad, Norway, May 2004.

* cited by examiner

METHOD AND APPARATUS FOR PREVENTING UNAUTHORIZED DATA FROM BEING TRANSFERRED

CROSS REFERENCED TO RELATED APPLICATIONS

This application claims priority to U.S. Provisional Application No. 60/633,222, filed on Dec. 3, 2004, which is incorporated by reference herein in as if fully set forth,

FIELD OF INVENTION

The present invention relates to sensed data. More particularly, the present invention relates to a method and apparatus for preventing unauthorized data from being transferred.

BACKGROUND

With ever increasing sophistication in available technology, piracy of intellectual property has become widespread. Pirated movies on DVD or VHS often appear concurrently with the first run of the movies in theaters. Making anti-piracy efforts even more difficult, sensing devices which used to be somewhat bulky have become miniaturized, such that their physical presence often escapes detection. These sensing devices such as cameras, microphones, video recorders, and sound recorders can now be embedded in phones, personal digital assistants (PDAs), watches, or any other wireless transmit/receive unit (WTRU) that a manufacturer desires. It has therefore become easier than ever to secrete a sensing device into an event such as a play, movie, and the like.

These sensing devices can record and/or transmit images and sounds that are not authorized to be recorded or transmitted by the individual recording them. Once a scene or a sound has been captured, the sensed data may be distributed fairly easily through a variety of channels, such as a cellular or other wireless communication network.

To combat this piracy, some businesses have attempted to regulate miniaturized sensing devices by either posting restrictions in restricted areas or by physically searching for their existence. However, these methods are often difficult to enforce, ineffective and inefficient.

Electronic control of sensing has been attempted with systems which broadcast radio frequency (RF) beacons that signal sensing devices to disable their sensing functionality. The problem, however, with electronically regulating sensing devices in such a manner is that a sensing device must be so equipped in order to receive such RF signals, and a large number of sensing devices are not. In those devices that are so equipped, the RF receiving functionality can easily be modified by the user of the device whom may be able to hack into, and disable, the functionality preventing sensing.

Since modern WTRUs often come integrated with enhanced storage and transmission functionality, an ever increasing quantity of timely unauthorized data can be transferred by the WTRU. Accordingly, it is desirable to have a method and apparatus for preventing the transfer of unauthorized data over a wireless communication system.

SUMMARY

A method and apparatus for preventing the transfer of unauthorized data among a wireless transmit/receive unit (WTRU), an external network, and at least one access point in a wireless communication system includes the WTRU recording a subject and storing the recording as data in a memory of the WTRU. The WTRU transmits the data to the access point. The access point examines the data to determine if the data is permitted to be transferred to the external network.

BRIEF DESCRIPTION OF THE DRAWINGS

The foregoing summary, as well as the following detailed description of the preferred embodiments of the present invention will be better understood when read with reference to the appended drawings, wherein.

DETAILED DESCRIPTION OF THE PREFERRED EMBODIMENTS

Hereafter, the terminology "WTRU" includes, but is not limited to, a user equipment (UE), a computer, a mobile station, a fixed or mobile subscriber unit, a pager, or any other type of device capable of operating in a wireless environment. When referred to hereafter, an access point (AP) includes a base station or a radio network controller (RNC), including but not limited to a Node-B, site controller, or any other type of interfacing device in a wireless environment.

Figure 1:
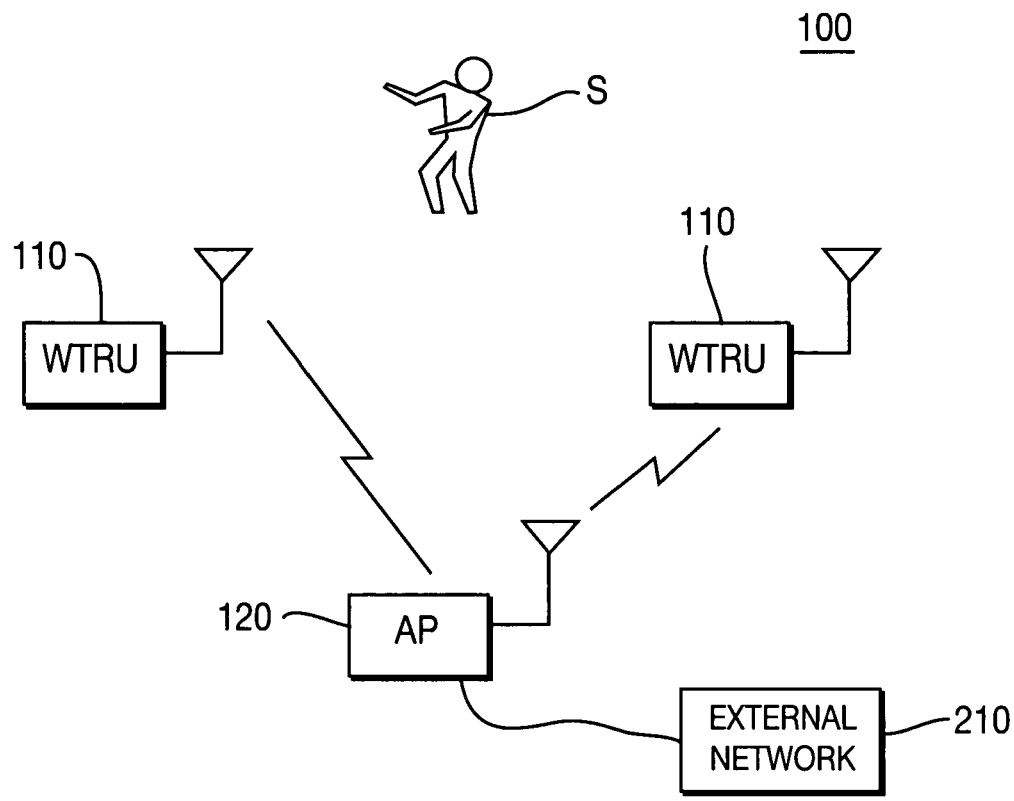
FIG. 1 shows a wireless communication system configured in accordance with the present invention.

FIG. 1 is a wireless communication system 100 configured in accordance with the present invention. The wireless communication system 100 includes a plurality of WTRUs 110 and at least one AP 120 in communication with the WTRUs 110. The AP 120 is in communication with an external network 210, and is therefore capable of permitting the WTRUs 110 to communicate with the external network 210 to transfer data.

The external network 210 may include the Internet, a plain old telephone service (POTS) network, a public switched telephone network (PST), or any other system known to one of ordinary skill in the art adapted to allow the transfer of data. Also shown is a subject S, which may be sensed, or recorded, by the WTRUs 110. Although not part of the present invention, a watermark may be imparted upon the subject S in a variety of ways. For example, the watermark may be generated by a watermark generator (not shown) in the environment where the subject S exists. That is, the watermark generator may project the watermark onto to the subject S from a location proximate to the subject S. The imparted watermark on the subject S may be utilized to regulate the transfer of any data containing the subject S in the WTRUs 110.

Figure 2:
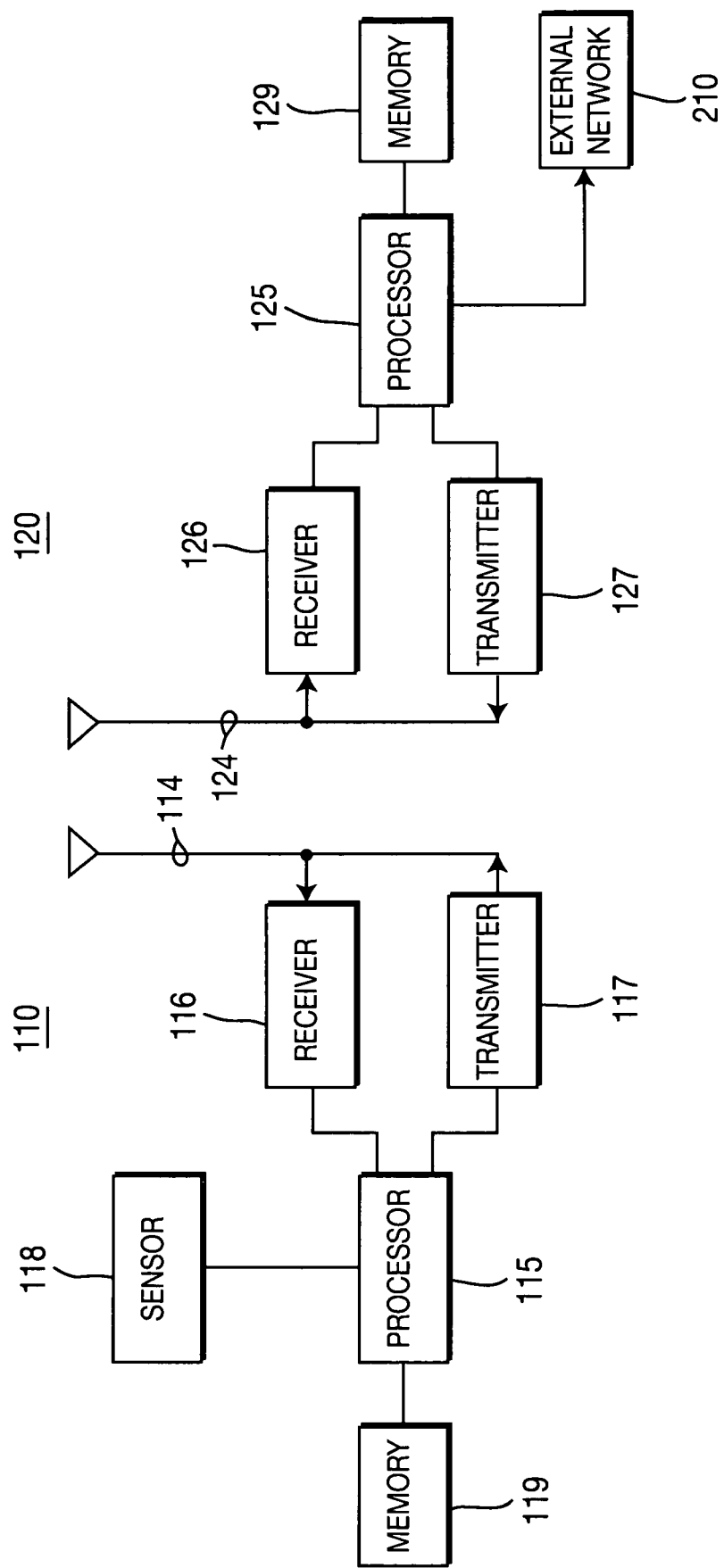
FIG. 2 shows a block diagram of a WTRU and an access point configured to perform a method for preventing unauthorized data from being transferred.

FIG. 2 shows a block diagram of the WTRU 110 and the AP 120 configured to prevent the transfer of unauthorized data, in accordance with the present invention.

In addition to the nominal components included in a typical WTRU, the WTRU 110 includes a processor 115 configured to process sensed data, a receiver 116 in electrical communication with the processor 115, a transmitter 117 in electrical communication with the processor 115, a sensor 118 in electrical communication with the processor 115, a memory 119 in electrical communication with the processor 115, and an antenna 114 in electrical communication with both the receiver 116 and the transmitter 117 to facilitate the transferring and receiving of wireless data.

The sensor 118 in a preferred embodiment of the present invention may be a video or audio sensor to record video images or audio waves. However, the sensor 118 may be any sensor known to one of ordinary skill in the art that can be utilized to sense data such as the subject S or any watermark imparted upon the subject S. The receiver 116 and transmitter 117 of the WTRU 110 include any type of receiver and transmitter capable of wirelessly receiving and transmitting data, respectively, through the antenna 114.

In addition to the nominal components included in a typical access point, the AP 120 includes a processor 125 configured to prevent the transfer of unauthorized data from the WTRU 110, a receiver 126 in electrical communication with the processor 125, a transmitter 127 in electrical communication with the processor 125, a memory 129 in electrical communication with the processor 125, and an antenna 124 in electrical communication with both the receiver 126 and the transmitter 127 to facilitate the transferring and receiving of wireless data. In addition, the processor 125 is in communication with the external network 210.

The receiver 126 and transmitter 127 of the AP 120 include any type of receiver and transmitter capable of wirelessly receiving and transmitting data, respectively, through the antenna 124.

Figure 3:
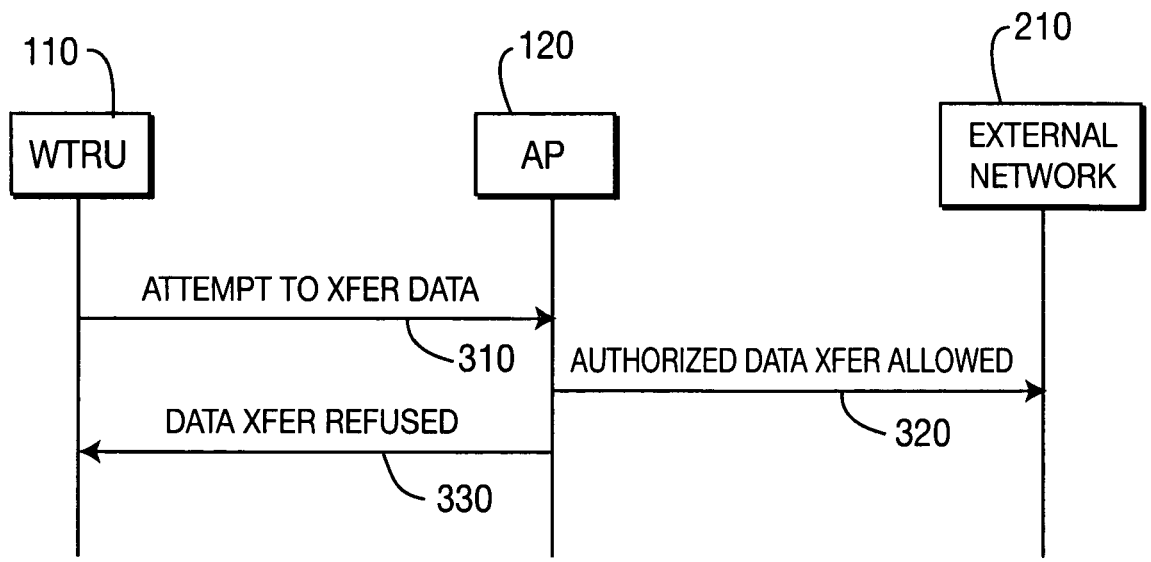
FIG. 3 shows a signal diagram of the WTRU and access point performing a method of preventing the transmission of unauthorized data in the wireless communication system of FIG. 1.

FIG. 3 shows a signal diagram between the WTRU 110, the AP 120, and the external network 210 during an attempt by the WTRU 110 to transfer data to the external network 210 through the AP 120. In general, the sensor 118 of the WTRU 110 senses the subject S and any imparted watermark as data, which it transfers to the processor 115 of the WTRU 110 for transmission of the data (310) via the transmitter 117 and antenna 114 to the AP 120. The receiver 126 of the AP 120 receives the data from the WTRU 110 through the antenna 124 and transfers the data to the processor 125, which examines the data to determine whether to permit transfer of the data to the external network 210.

If the data contains no watermark or a watermark that permits transfer, then the processor 125 authorizes the data to be transferred to the external network 210 (320). If the data contains a watermark that does not permit transfer, then the data transfer will be refused (330) by the processor 125 of the AP 120. Depending on a sensitivity level of the watermark, which will be described in more detail below, the processor 125 may take additional action beyond simply permitting or refusing the transfer of the data (330).

Figure 4:
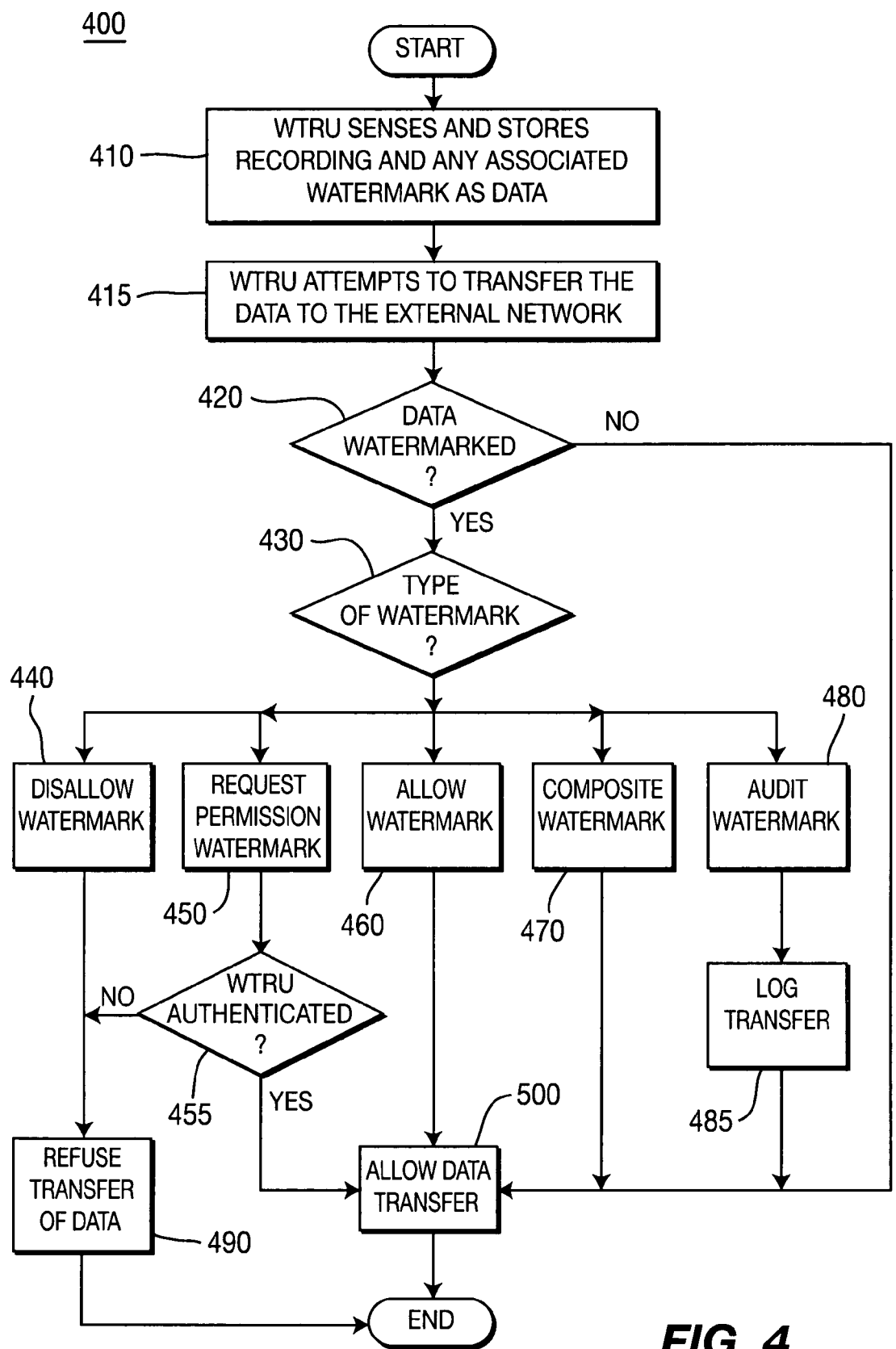
FIG. 4 is a flow diagram depicting a preferred method of preventing the transmission of unauthorized data, in accordance with the present invention.

FIG. 4 is a flow diagram depicting a preferred method 400 of preventing the transmission of unauthorized data, in accordance with the present invention. In step 410, the sensor 118 of the WTRU 110 senses the subject S and transfers a recording thereof to the processor 115, which stores the sensed subject S, along with any watermark imparted thereon, as data in the memory 119 of the WTRU 110. The processor 115 of the WTRU 110 then attempts to transfer the data (step 415) from the memory 119 to the external network 210 by transmitting the data to the AP 120 through the transmitter 117 and antenna 114 of the WTRU 110.

The receiver 126 receives the data from the antenna 124, and transfers the data to the processor 125 of the AP 120. The processor 125 examines the data to determine if a watermark is imparted on it (step 420). If no watermark is present in the data, then the processor 125 permits the data to be transferred to the external network 210 (step 500). If a watermark is present in the data, then the processor 125 of the AP 120 determines the type of watermark present in the data (step 430) and acts in accordance with Table 1 below.

TABLE 1

| WATERMARK TYPE | SENSITIVITY LEVEL | ACTION |
| --- | --- | --- |
| None | N/A | Allow Data Transfer |
| Allow | N/A | Allow Data Transfer |
| Disallow | None | Refuse Data Transfer |
| Disallow | 1 | Refuse Data Transfer |
| Disallow | 2 | Refuse Data Transfer and Warn WTRU of Attempt to Transfer Unauthorized Data |
| Disallow | 3 | Refuse Data Transfer, Warn WTRU against Attempt to Transfer Unauthorized Data, and Place WTRU on a Blacklist |
| Disallow | 4 | Refuse Data Transfer, Warn WTRU of Attempt to Transfer Unauthorized Data, Place WTRU on a Blacklist, and Alert Security Personnel |
| Request Permission | N/A | Authenticate WTRU |
| Composite | N/A | Allow Data Transfer |
| Audit | N/A | Allow Data Transfer and Log Transfer |

If an allow watermark (step 460) is present in the data, then the processor 125 of the AP 120 allows transfer of the data to the external network 210 (step 500).

If a disallow watermark (step 440) is present in the data, then the processor 125 refuses the transfer of the data to the external network 210 (step 490). Depending on the whether or not a sensitivity level is associated with the watermark, the processor 125 of the AP 120 may take additional actions.

If there is no sensitivity level associated with the disallow watermark, or a sensitivity level of 1 is associated with the watermark, then the processor 125 takes no additional action beyond refusing the transfer of the data.

If there is a sensitivity level of 2 associated with the watermark, then the processor 125 refuses the transfer of data to the external network 210 (step 490) and transmits a warning to the WTRU 110 attempting to transfer the unauthorized data via the transmitter 127 and antenna 124 of the AP 120. This warning can be a visual or audible message transmitted to the WTRU 110 by the processor 125 of the AP 120, or any other warning known to one of ordinary skill in the art.

If there is a sensitivity level of 3 associated with the watermark, the processor 125 refuses the transfer of data to the external network 210 (step 490), transmits a warning to the WTRU 110 attempting to transfer the unauthorized data via the transmitter 127 and antenna 124 of the AP 120, and blacklists the WTRU 110 attempting to transfer the unauthorized data. The processor 125 may accomplish this by storing identifying information regarding the WTRU 110 in the memory 129 of the AP 120. This identifying information stored in the memory 129 may then be accessed at a later point in time by the processor 125 the next time the particular WTRU 110 associated with the identifying information attempts to transfers data to the external network 210. In a preferred embodiment of the present invention, the WTRU 110 would be subsequently prevented from transferring any data to the external network 210 once placed on the blacklist. Additionally, the WTRU 110 may be refused a connection the next time the WTRU 110 attempts to connect.

If there is a sensitivity level of 4 associated with the watermark, the processor 125 of the AP 120 refuses the transfer of data to the external network 210 (step 490), transmits a warning to the WTRU 110 attempting to transfer the unauthorized data via the transmitter 127 and antenna 124 of the AP 120, blacklists the WTRU 110 attempting to transfer the unauthorized data, and transmits an alert to security personnel via the transmitter 127 and the antenna 124 of the AP 120. The security personnel may receive this alert on WTRUs 110 that they possess. In a preferred embodiment of the present invention, the security personnel are local security personnel that may be able to apprehend the individual attempting unauthorized transfer of data. However, less local security personnel may be notified for a response at a later time.

Although only five security levels (none, 1, 2, 3, and 4) associated with the disallow watermark have been discussed, it can be seen by one of ordinary skill in the art that any number of security levels can be associated with the disallow watermark. Moreover, a person of ordinary skill in the art can appreciate that additional actions to the ones described above can be undertaken, as well as varying the combination of actions described above. For example, the action taken for a disallow watermark having an associated sensitivity level of 3 can further include the action taken for a disallow watermark having an associated sensitivity level of 4.

If a request permission watermark is present in the data (step 450), then the processor 125 of the AP 120 attempts to authenticate the WTRU 110 that is attempting to transfer data to the external network 210 (step 455). If the processor 125 authenticates the WTRU 110, then the processor 125 allows the transfer of data to the external network (step 500). Otherwise, the transfer is refused (step 490).

An example of WTRU identification may be in the form of an identification code stored in the memory 119, associated with the particular WTRU 110 attempting to transfer the data being transmitted along with the data by the WTRU 110. For example, when the WTRU 110 desires to transfer the data to the external network 210, the processor 115 of the WTRU 110 extracts the authentication code from the memory 119 and transmits it, along with the data, to the AP 120 via the transmitter 117 and antenna 114 of the WTRU 110.

The receiver 125 of the AP 120 receives the data along with the identification code from the antenna 124 and transfers it to the processor 125. The processor 125 searches the memory 129 for valid identification codes to determine if the authentication code sent by the WTRU 110 is valid. If the authentication code sent by the WTRU 110 is valid, then the processor 125 allows transfer of the data to the external network 210 (step 500). If the authentication code is not valid, then the processor 125 refuses the data transfer to the external network 210 (step 490).

For example, a security office at an event might provide an access pass code as the identification code to some WTRU 110 users in order to enable them to record and transfer data to the external network 210 during that particular session. Accordingly, the WTRUs 110 that can transmit the identification code will pass the authentication, while WTRUs not transmitting the identification code will not be able to do so, and thus will be refused transfer of data to the external network 210. In a preferred embodiment of the present invention, the identification code will expire after the session.

If a composite watermark is present in the data (step 470), then the processor 125 allows the transfer of the data to the external network 210 (step 500). In a preferred embodiment of the present invention, the composite watermark typically includes the disallow watermark introduced by the environment combined with the allow watermark. An example of the composite watermark may be a watermark that is contained on the WTRU of a security officer. This composite watermark may override any other watermark in order to allow the transfer of data to the external network 210 without any other restrictions.

If an audit watermark is present in the data (step 480), then the processor 125 of the AP 120 allows the transfer of the data to the external network 210 (step 500), and logs the transfer (step 485) in the memory 129 of the AP 120 for later access. For example, after allowing the transfer, the event can be logged for auditing purposes later, such as how many recordings were made of the subject, how many were transferred, or the like.

Although the features and elements of the present invention are described in the preferred embodiments in particular combinations, each feature or element can be used alone without the other features and elements of the preferred embodiments or in various combinations with or without other features and elements of the present invention. For example, in a preferred embodiment of the present invention, the method may be performed by an application running on the processor of the access point, or alternatively, may be implemented as an integrated circuit (IC).

What is claimed is:

1. A method for preventing the transfer of unauthorized data among a wireless transmit/receive unit (WTRU), an external network, and at least one access point in a wireless communication system, comprising:
   the WTRU recording a subject and storing the recording as data in a memory of the WTRU;
   the WTRU transmitting the data to the access point; and
   the access point examining the data to determine if the data is allowed for transfer to the external network and access point refuses the transfer of the data to the external network if the WTRU cannot authenticate itself.

2. The method of claim 1, wherein the access point allows the transfer of the data to the external network if the data does not include a watermark.

3. The method of claim 1, wherein the data includes a watermark imparted on it.

4. The method of claim 3, wherein the watermark is an allow watermark.

5. The method of claim 4, wherein the access point allows the transfer of the data to the external network.

6. The method of claim 3, wherein the watermark is a disallow watermark.

7. The method of claim 6, wherein no sensitivity level is associated with the watermark and the access point refuses the transfer of the data to the external network.

8. The method of claim 6, wherein a sensitivity level is associated with the watermark and the access point refuses the transfer of the data to the external network.

9. The method of claim 8, wherein the access point warns the user of the WTRU of the attempt to transfer unauthorized data.

10. The method of claim 9, wherein the access point warning the user of the WTRU of the attempt to transfer unauthorized data includes transmitting a message to the user on the WTRU.

11. The method of claim 9, wherein the access point places the WTRU on a blacklist.

12. The method of claim 11, wherein the access point stores identifying information about the WTRU in a memory of the access point.

13. The method of claim 11, wherein the access point notifies security personnel of the attempt by the WTRU to transfer unauthorized data to the external network.

14. The method of claim 3, wherein the watermark is a composite watermark and the access point allows the transfer of the data to the external network.

15. The method of claim 3, wherein the watermark is an audit watermark and the access point allows the transfer of the data to the external network.

16. The method of claim 15, wherein the access point logs the transfer of the data to the external network by storing the transfer in a memory of the access point.

17. The method of claim 3, wherein the watermark is a request permission watermark.

18. The method of claim 17, wherein the access point authenticates the WTRU attempting to transfer the data to the external network.

19. The method of claim 1, wherein the WTRU attempting to transfer the data to the external network extracts an identification code from the memory of the WTRU and transmits the identification code along with the data.

20. The method of claim 19, wherein the access point compares the identification code transmitted by the WTRU to codes stored in a memory of the access point to determine if the WTRU has authenticated.

21. The IC of claim 1, further comprising an antenna in communication with the transmitter and the receiver.

22. In a wireless communication system comprising a plurality of wireless transmit/receive units (WTRUs), an access point, and an external network, the access point comprising:
   a transmitter;
   a receiver; and
   a processor in communication with the transmitter and the receiver, wherein an application for preventing the unauthorized transfer of data from the WTRUs to the external network in the wireless communication system runs on the processor, the receiver receives an attempt from one of the WTRUs attempting to transfer data to the external network, the processor examines the data to determine if the transfer of data is authorized and if the WTRU is authenticated, and the processor transfers the data to the external network if the transfer is authorized and the WTRU is authenticated and the processor refuses the transfer of the data to the external network if the WTRU cannot authenticate itself.

23. The access point of claim 22, further comprising a memory in communication with the processor.

24. The access point of claim 22, further comprising an antenna in communication with the transmitter and receiver.

25. In a wireless communication system comprising a plurality of wireless transmit/receive units (WTRUs), an access point, and an external network, the access point including an integrated circuit (IC) comprising:
   a transmitter;
   a receiver; and
   a processor in communication with the transmitter and the receiver, wherein an application for preventing the unauthorized transfer of data from the WTRUs to the external network in the wireless communication system runs on the processor, the receiver receives an attempt from one of the WTRUs attempting to transfer data to the external network, the processor examines the data to determine if the transfer of data is authorized, and to determine whether the WTRU has been authorized, and the processor transfers the data to the external network if the transfer is authorized and the WTRU has been authenticated and the processor refuses the transfer of the data to the external network if the WTRU cannot authenticate itself.

26. The IC of claim 25, further comprising a memory in communication with the processor.

* * * * *

UNITED STATES PATENT AND TRADEMARK OFFICE
CERTIFICATE OF CORRECTION

PATENT NO. : 7,321,761 B2
APPLICATION NO. : 11/284940
DATED : January 22, 2008
INVENTOR(S) : Sanjeev K. Sharma It is certified that error appears in the above-identified patent and that said Letters Patent is hereby corrected as shown below:

ON THE TITLE PAGE

At section (56), U.S. PATENT DOCUMENTS, page 2, left column, line 27, after the line beginning with "2003/0078076", insert therefor --2003/0091213  5/2003 Yamakage et al.--.

IN THE SPECIFICATION

At column 1, line 54, after the word "device", delete "whom" and insert therefor --who--.

At column 2, line 50, after the word "network", delete "(PST)" and insert therefor --(PSTN)--.

At column 4, line 39, after the words "Depending on", delete "the".

At column 5, line 20, before the word "local", delete "less".

IN THE CLAIMS

At claim 10, column 7, line 4, after the word "user", delete "on" and insert therefor --of--.

Signed and Sealed this

Twenty-ninth Day of July, 2008

JON W. DUDAS
*Director of the United States Patent and Trademark Office*